United States Patent Office 3,766,287
Patented Oct. 16, 1973

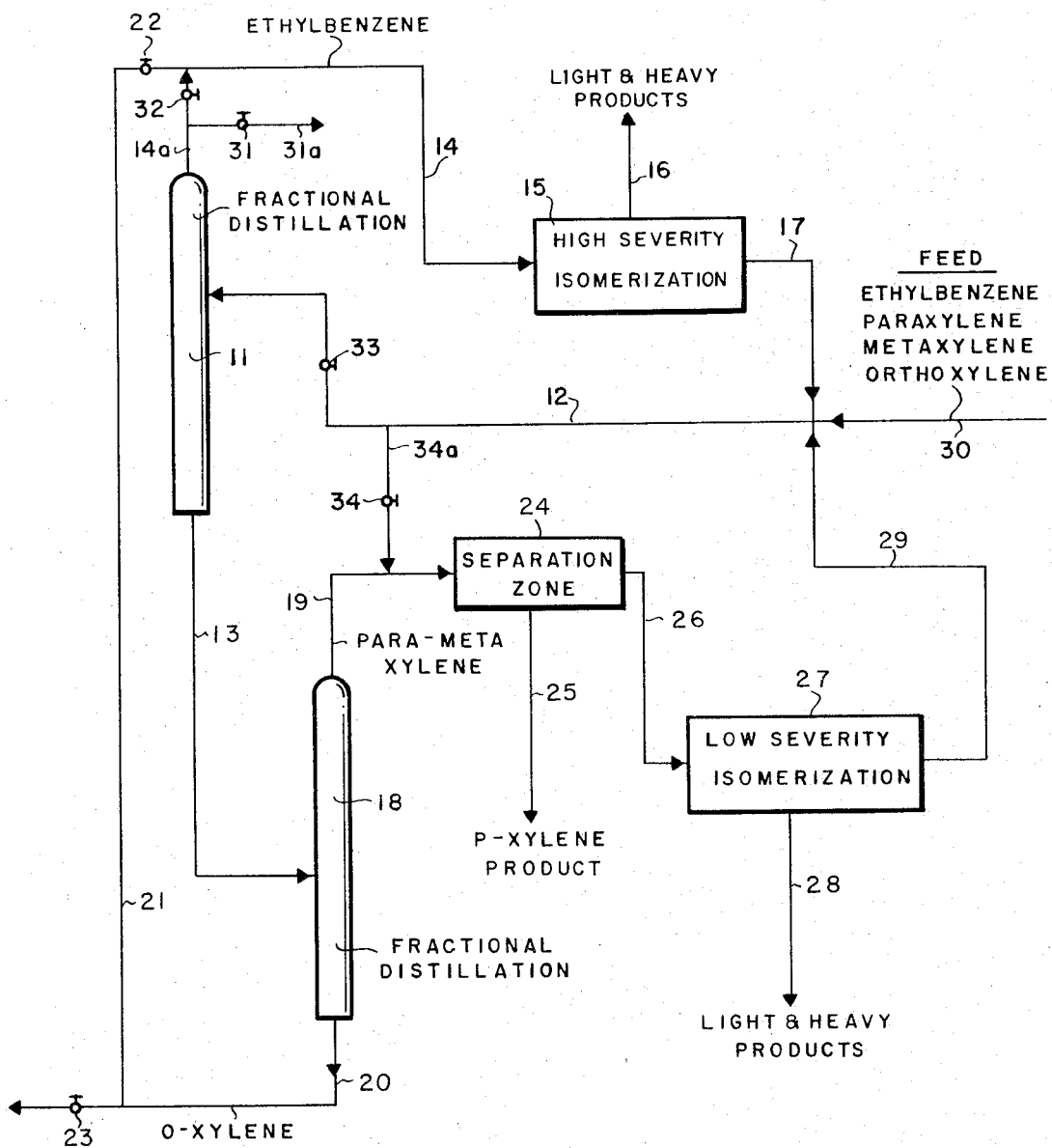

3,766,287
SEPARATION OF C$_8$ AROMATIC HYDROCARBONS
Donald G. Stenmark, Houston, and Robert D. Wesselhoft, Baytown, Tex., assignors to Esso Research and Engineering Company
Filed July 23, 1971, Ser. No. 165,600
Int. Cl. C07c 15/08
U.S. Cl. 260—668 A      16 Claims

ABSTRACT OF THE DISCLOSURE

Paraxylene is recovered from a mixture of xylenes and ethylbenzene by separating the mixture into two streams—one which is rich in ethylbenzene and orthoxylene and another which is rich in metaxylene—and separately isomerizing the two streams under different conditions to obtain a maximum amount of paraxylene.

BACKGROUND OF THE INVENTION

(1) Field of the invention

The present invention is directed to separation and production of C$_8$ aromatic hydrocarbons. More particularly, the invention is concerned with the production of paraxylene from its isomers. In its more specific aspects, the invention is directed to subjecting different fractions of C$_8$ aromatic hydrocarbon isomers in non-equilibrium amounts to different conditions of isomerization to separate and produce a maximum amount of paraxylene from a mixture of C$_8$ aromatic hydrocarbons.

(2) Description of the prior art

It has been well known heretofore to isomerize a mixture of C$_8$ aromatic hydrocarbons and to separate paraxylene therefrom by crystallization or by adsorption selectively on an adsorbent such as a molecular sieve. It has also been known to separate ethylbenzene and orthoxylene from the C$_8$ aromatic hydrocarbon mixture and isomerize the metaxylene and recover paraxylene by crystallization and the like.

Ethylbenzene has been recovered by distillation from a C$_8$ aromatic hydrocarbon mixture, as well as orthoxylene, and the metaxylene isomerized to paraxylene subsequent to removal of the naturally present paraxylene with recycle of the unreacted isomers. Such processes are disclosed in British Pat. 1,198,592 published July 15, 1970, and in U.S. Pat. 3,522,153. A similar operation is described in German application 1,905,650 open Aug. 20, 17970. In the present invention the orthoxylene as well as metaxylene both form a source for paraxylene and the ethylbenzene is converted effectively to lighter and heavy which heretofore was not taught or obvious.

SUMMARY OF THE INVENTION

The present invention may be briefly described and summarized as a method for separating and producing paraxylene from a feed mixture with its isomers including ethylbenzene, metaxylene, and orthoxylene in non-equilibrium amounts, wherein the mixture is subjected to fractional distillation to obtain a first distillate rich in ethylbenzene and containing smaller amounts of metaxylene, paraxylene and orthoxylene and a second distillate rich in metaxylene and containing smaller amounts of paraxylene, orthoxylene and ethylbenzene. Orthoxylene is recovered as a bottom fraction and is admixed with the first distillate which is then isomerized under severe isomerization conditions over an isomerization catalyst. The second distillate has paraxylene substantially removed from it, and the remainder is then isomerized under less severe conditions than those to which the first distillate is subjected. The isomerized products are combined and may be admixed with the feed mixture and the cycle is repeated with the result that only paraxylene is produced as a desired product, the ethylbenzene and orthoxylene being recycled to extinction by virtue of using more severe isomerization conditions for the ethylbenzene and orthoxylene. Optionally, if desired some or all of the ethylbenzene and orthoxylene may be recovered as products. Ordinarily the feed mixture may not be mixed with the isomerizate and the product streams recycled in block fashion.

BRIEF DESCRIPTION OF THE DRAWING

The present invention will be further described and illustrated by reference to the drawing in which the single figure is a flow diagram of a preferred mode and embodiment.

DESCRIPTION OF THE PREFERRED MODE AND EMBODIMENT RELATIVE TO THE DRAWING

Referring now to the drawing, numeral 11 designates a fractional distillation tower provided with internal vapor-liquid contacting means such as bellcap trays not shown and heating means and other appurtenant means also not shown for separating one close boiling xylene from its isomer, in this instance ethylbenzene from metaxylene and other isomers. Tower 11 has a line 12 leading into it by way of which a non-equilibrium feed mixture of ethylbenzene, ortho, meta and paraxylene as well as unreacted products from the isomerization zones are charges. A fraction comprising paraxylene, orthoxylene, and metaxylene is removed by line 13 while ethylbenzene is taken overhead by line 14a and may be either discharged from the system by opening valve 31 in line 31a and closing valve 32 or added into line 14 by opening valve 32 and closing valve 31 and introduced thereby into isomerization zone 15 operating under high severity conditions which are given hereinafter. Zone 15 comprises separation facilities for removing light and heavy fractions originally present or formed in zone 15. These separation facilities may suitably be fractional distillation facilities and the like. The light and heavy fractions are shown removed by line 16 but usually will be removed by separate lines. The effluent product from zone 15 comprised of paraxylene is discharged by line 17 into feed line 12 for recycling to tower 11 but may be treated in blocked operations as will be described.

The bottoms fraction removed from tower 11 by line 13 comprising ortho, meta, and paraxylene are charged thereby to fractional distillation tower 18 which is similarly equipped to tower 11. In fact, towers 11 and 18 may be a single fractional distillation zone comprised of one tower but is shown as two towers for the sake of convenience. In any event, a paraxylene-metaxylene stream is removed by line 19 and an orthoxylene stream by line 20 which may be recycled to line 14 by line 21 with valve 22 in the open position. Orthoxylene may be discharged from the system and recovered as a product by closing valve 22 and opening valve 23 in line 20.

The paraxylene-metaxylene fraction flows by line 19 into a separation zone 24 which may be a crystallization zone operated under suitable low temperature conditions which are well known to crystallize paraxylene at low temperatures and allow it to be removed by means 25; zone 24 may also comprise a filter or centrifuge and means 25 may include heating means to allow recovery of the paraxylene as a liquid. Zone 24 may also be an adsorption zone which selectively separates para- and metaxylene. Suitable adsorbents are known for separating para- and metaxylene and further details thereof are not given here.

The metaxylene from which the paraxylene is substantially removed in charged to an isomerization zone 27 which operates under low severity conditions which are given herein with the metaxylene being converted largely to paraxylene. Any light and heavy fractions produced in the isomerization operation or normally present in the stream introduced by line 26 are removed by line 28 which ordinarily will be two lines but which is shown solely for convenience as one line since zone 27 may, like zone 15, comprise fractional distillation means, adsorption means, other separation means, and the like. The product is then introduced by line 29 into line 12 for admixture with the feed introduced into line 12 by line 30.

It will thus be apparent, from the foregoing description that a simple method which has not been taught in nor obvious from the art has been devised where metaxylene and orthoxylene containing ethylbenzene are separately converted to enhance the production of valuable paraxylene which is recovered for use as desired.

The isomerization conditions are shown in the following tabulation for various types of catalysts. The $MoO_3$ on silica-alumina catalysts are also described in the patents to Amir U.S. 3,484,385, Amir et al. U.S. 3,410,919, and Amir et al. U.S. 3,449,456.

RANGE OF ISOMERIZATION CONDITIONS
[Range of Low and High Severity Conditions]

| | Catalyst | | |
|---|---|---|---|
| | $MoO_3$ on silica-alumina [1] | $MoO_3$ on hydrogen form of a zeolite (offretite) having the composition listed below [2] | Platinum or palladium on zeolite (offretite) having the composition listed below [3] |
| Temp., °F | 500–850 | 700–950 | 700–950 |
| Press., p.s.i.g | 100–700 | 150–500 | 150–500 |
| Liquid feed rate, v./v./hr | 0.1–10 | 0.1–10 | 0.1–10 |
| $H_2$ to feed, mole ratio | 2:1–15:1 | 2–15:1 | 3:1–15:1 |
| $H_2$ purity $\phi$, mole percent | 50–100 | 50–100 | 50–100 |
| $N_2$, mole percent | 0.1–4.0 | 0.1–4 | 0.1–4 |

[1] Shaped silica-alumina molybdenum-containing catalyst exposed to hydrogen pressure of at least 100 p.s.i.g. followed by heating to a temperature of about 650°, to no greater than 850° F. for at least 16 hours.
[2] Synthetic zeolite base having a mol ratio of oxides as follows: $1.0\pm0.1\ (1-x)Me_2O:X(N(CH_3)_4)_2O]\cdot Al_2O_3:6.5\pm1.0\ SiO_2:YH_2O$ where X has a value of about 0.001 to about 0.2 and Y may be any value from 0 to about 10 and Me represents an alkali selected from the group consisting of alkali metals and their mixtures. Heat treatment of catalyst base from about 1,000° to 1,500° F. and held at latter temperature for about 1 to 24 hours. Steamed started at about 700° F. with temperature increased at rate of about 100° F. per hour until 1,500° F. is reached; cooled to ambient temperature and base exchanged with an aqueous solution of ammonium paramolybdate to provide a catalyst containing from about 3% to about 10% by weight. $MoO_3$ on dry basis.
[3] Synthetic zeolite base having a mol ratio of oxides as follows: $1.0\pm0.1, (1-x)\ Me_2O:(X)(N(CH_3)_4)_2O]\cdot Al_2O_3:6.5\pm1.0\ SiO_2:YH_2O$ where X has a value of about 0.001 to about 0.2, Y may be any value from 0 to about 10 and Me represents either potassium or an alkali metal selected from the group consisting of potassium, sodium and mixtures thereof. The unit cell of the zeolite base is hexagonal with an A axis 13.31 A. and C axis 7.59 A.; that is with the C axis being half that of erionite which may be used. The zeolite base is an ion exchanged with an ammonium salt ($NH_4Cl_3$, ($NH_4)_2SO_4$, or $NH_4NO_3$) in an aqueous solution to form the ammonium form and heated to liberate $NH_3$ and form the hydrogen base which is calcined at a temperature from about 700° F. to about 1,500° F. and held for about 1 to 24 hours in presence of steam which is started at 700° with temperature increased at a rate of about 100° F. per hour. It is then cooled to ambient temperature and impregnated or exchanged with an ammoniacal solution of palladium or platinum chloride to give a catalyst containing about 0.1 to about 1.0% by weight of metal.

NOTE.—$\phi$ Impurities include $C_1$ to $C_5$ light hydrocarbons. Low severity conditions: The low severity conditions are in the same range as the high severity conditions but generally will differ in at least one respect or another such as liquid feed rate, temperatures, concentration of the various components in the streams exposed to the isomerization conditions, and the like.

EXAMPLE 1

To illustrate the present invention further, reference is made to the following material balance where the composition of the various streams is given as designated by the numerals identifying the several lines in the drawing for 80% ethylbenzene recovery at 80% purity:

MATERIAL BALANCE WITH PREFRACTIONATION AND PARALLEL ISOMERIZATION

| Stream | Feed | 19 | 26 | 29 | 17 | 12 | 14a | 13 | 20 | 14 | Px |
|---|---|---|---|---|---|---|---|---|---|---|---|
| Percent: | | | | | | | | | | | |
| Ethylbenzene | 10.0 | 8.4 | 10.4 | 10.2 | 48.0 | 25.1 | 80.0 | 6.7 | 0.0 | 50.0 | |
| Paraxylene | 19.2 | 26.8 | 9.0 | 21.9 | 12.0 | 18.0 | 6.0 | 21.8 | 1.2 | 4.2 | 100.0 |
| Metaxylene | 41.6 | 63.5 | 79.1 | 53.5 | 27.3 | 43.0 | 14.0 | 51.1 | 2.8 | 10.2 | |
| Orthoxylene | 19.2 | 1.3 | 1.5 | 14.4 | 12.7 | 13.9 | 0.0 | 20.4 | 95.0 | 35.6 | |
| Total $C_8$* | 100.0 | 313.0 | 251.7 | 242.7 | 180.3 | 523.0 | 131.2 | 391.8 | 78.8 | 210.0 | 61.3 |

*Relative to 100 parts feed.

From the foregoing table, it is clear that the ethylbenzene and orthoxylene are substantially converted and pure paraxylene is obtainable with high recoveries of the ethylbenzene and orthoxylate for charging to the several isomerization zones the conditions of which are indicated in the table below with recycling to extinction.

[Catalyst: $MoO_3$ on silica-alumina]

| | Isomerization conditions | |
|---|---|---|
| Operation | High severity (15) | Low severity (27) |
| Temp., °F | 750 | 750 |
| Press., p.s.i.g | 250 | 250 |
| Liq. feed rate, v./v./hr | 0.67 | 2.0 |
| $H_2$ to feed, mole ratio | 8.5/1 | 8.5/1 |
| $H_2$ purity, mole percent | 85 | 85 |
| $N_2$, mole percent | 0.2 | 0.2 |

EXAMPLE 2

By way of comparison with Example 1, reference is made to the following material balance and the drawing whereby the fractional distillation means (zones 11 and 18) are *not* employed (by opening valve 34 in line 34a and closing valve 33) whereby only one isomerization step (zone 27) is employed at the "low severity" conditions of Example 1:

| Stream | Feed | 19 | 26 | 29 | Px |
|---|---|---|---|---|---|
| Percent: | | | | | |
| Ethylbenzene | 20.0 | 32.9 | 35.2 | 34.5 | 100.0 |
| Paraxylene | 19.0 | 14.9 | 9.0 | 14.4 | |
| Metaxylene | 42.0 | 35.5 | 38.0 | 34.7 | |
| Orthoxylene | 19.0 | 16.7 | 17.8 | 16.4 | |
| Total $C_8$* | 100.0 | 895.3 | 837.0 | 795.3 | 58.3 |

*Relative to 100 parts feed.

From the foregoing table it is clear that stream 19 which flows into the paraxylene separation zone 24 is overly large compared to the same stream in Example 1 and that the recovery of paraxylene is also lower. In addition, stream 26 which flows into the isomerization zone 27 is overly large compared to the combined streams, 26 and 14, which flow into both isomerization zones (27 and 15) in Example 1.

EXAMPLE 3

By way of further comparison with Example 1, reference is made to the following material balance and the drawing whereby the fractional distillation means (zones 11 and 18) are *not* employed as in Example 2 and whereby only one isomerization step (zone 27) is employed at the "high severity" conditions of Example 1:

| Stream | Feed | 19 | 26 | 29 | Px |
|---|---|---|---|---|---|
| Percent: | | | | | |
| Ethylbenzene | 20.0 | 24.2 | 26.8 | 25.3 | |
| Paraxylene | 19.0 | 18.0 | 9.0 | 17.7 | 100.00 |
| Metaxylene | 42.0 | 40.1 | 44.6 | 39.7 | |
| Orthoxylene | 19.0 | 17.7 | 19.6 | 17.3 | |
| Total C$_8$* | 100.0 | 486.3 | 438.4 | 386.3 | 47.9 |

* Relative to 100 parts feed.

From the foregoing table it is clear that the recovery of paraxylene is substantially lower compared to Example 1, and stream 19 which flows into the paraxylene separation zone 24 is also larger compared to Example 1.

From the foregoing examples, it is clear therefore that in a recycle process, the recovery of paraxylene from a mixture of xylenes and ethylbenzene is enhanced by separating the recycle mixture into two streams—one which is rich in ethylbenzene and orthoxylene and another which is rich in metaxylene—and separately isomerizing the two streams under different conditions to obtain a maximum amount of paraxylene.

While exemplary feed compositions are given, it is to be understood that we are not to be limited to the particular concentrations of any one component which are given by way of illustration and not by way of limitation.

The nature and objects of the present invention having been fully described and illustrated and the best mode and embodiments contemplated set forth, what we wish to claim as new and useful and secure by Letters Patent is:

1. A method for isomerizing a xylene fraction containing ethylbenzene, orthoxylene, metaxylene, and paraxylene in non-equilibrium amounts which comprises the steps of:
   fractionally distilling said fraction to obtain a first distillate rich in ethylbenzene and containing paraxylene, metaxylene and othoxylene, and a second distillate rich in metaxylene and containing paraxylene, orthoxylene and ethylbenzene;
   separately subjecting said first distillate to isomerization conditions in an isomerization zone in the presence of an isomerization catalyst to convert said first distillate to a first product enriched in paraxylene;
   separately subjecting said second distillate to a separation operation to recover paraxylene therefrom and to obtain a metaxylene enriched fraction;
   separately subjecting said metaxylene enriched fraction to isomerization conditions in an isomerization zone in the presence of an isomerization catalyst to convert selectively said metaxylene fraction to a second product enriched in paraxylene; and
   subjecting said products to separation to recover said paraxylene.

2. A method in accordance with claim 1 in which the first and second products are combined.

3. A method in accordance with claim 1 in which the first and second products are combined and then subjected to distillation and separation to recover said paraxylene.

4. A method in accordance with claim 1 in which the separation operation is a crystallization step.

5. A method in accordance with claim 1 in which the first distillate is subjected to high severity isomerization conditions and said metaxylene enriched fraction is subjected to low severity isomerization conditions.

6. A method in accordance with claim 5 in which the low severity isomerization conditions include the following conditions:

Temperature, ° F. _____ 750.
Pressure, p.s.i.g. _____ 250.
V./v./hour _____ 2.0.
Catalyst _____ MnO$_3$ on silica-alumina.
Hydrogen to feed, mole ratio _____ 8.5/1.
Hydrogen purity, mole percent _____ 85.
Nitrogen, mole percent _____ 0.2.

and the high severity isomerization condition includes the following conditions:

Temperature, ° F. _____ 750.
Pressure, p.s.i.g. _____ 250.
V./v./hour _____ 0.67.
Catalyst _____ MoO$_3$ on silica-alumina.
Hydrogen to feed, mole ratio _____ 8.5/1.
Hydrogen purity, mole percent _____ 85.
Nitrogen, mole percent _____ 0.2.

7. A method in accordance with claim 1 in which said low severity isomerization and said high severity isomerization are conducted in the same isomerization zone but at different times.

8. A method in accordance with claim 1 in which the isomerization conditions include a temperature within the range of about 500° F. to about 950° F. and a pressure within the range of about 150 to about 700 p.s.i.g., and a liquid feed rate of about 0.1 to about 16 v./v./hr.

9. A method in accordance with claim 1 in which the isomerization catalyst is MoO$_3$ on silica-alumina.

10. A method in accordance with claim 1 in which the isomerization catalyst is MoO$_3$ treated offretite.

11. A method in accordance with claim 1 in which the isomerization catalyst is palladium on treated offretite.

12. A method in accordance with claim 1 in which the isomerization catalyst is platinum on treated erionite.

13. A method in accordance with claim 1 in which the isomerization catalyst is platinum on treated offretite.

14. A method in accordance with claim 1 in which the isomerization catalyst is palladium on treated erionite.

15. A method in accordance with claim 1 in which the fractional distilling is conducted in separated distillation columns.

16. A method in accordance with claim 1 in which the fractional distilling is conducted in a single distillation column.

References Cited
UNITED STATES PATENTS

| | | | |
|---|---|---|---|
| 3,449,456 | 6/1969 | Amir et al. | 260—668 A |
| 3,584,068 | 6/1971 | Jackson et al. | 260—668 A |
| 3,384,676 | 5/1968 | Lester | 260—668 A |
| 3,582,497 | 6/1971 | Best et al. | 260—455 Z |
| 3,370,099 | 2/1968 | Plank et al. | 260—668 A |
| 3,636,121 | 1/1972 | Stine et al. | 260—668 A |
| 3,636,180 | 1/1972 | Broughton | 260—668 A |

CURTIS R. DAVIS, Primary Examiner

U.S. Cl X.R.
260—672 T, 674 A